United States Patent [19]

Dischert

[11] Patent Number: 4,536,238
[45] Date of Patent: Aug. 20, 1985

[54] METHOD AND APPARATUS FOR ALIGNING A CHUCK FOR HOLDING AN INFORMATION CONTAINING DISC STYLUS

[75] Inventor: William A. Dischert, Springfield, N.J.

[73] Assignee: RCA Corporation, Princeton, N.J.

[21] Appl. No.: 584,592

[22] Filed: Feb. 29, 1984

[51] Int. Cl.³ .............................................. B25B 11/02
[52] U.S. Cl. ..................................... 156/64; 29/281.1;
29/464; 156/293; 156/423; 156/539; 156/578;
269/7; 269/287; 269/902; 369/170
[58] Field of Search ...................... 29/281.1, 460, 464,
29/530, 721; 156/64, 293, 423, 538, 539, 578;
269/7, 287, 902; 279/1 R; 369/170

[56] References Cited

U.S. PATENT DOCUMENTS 3,417,454 12/1968 Beasley .................................. 29/468
3,638,934 2/1972 Blum et al. .......................... 269/311
3,768,146 10/1973 Braun et al. ........................... 29/460
3,842,194 10/1974 Clemens ........................... 369/279 X Primary Examiner—Robert A. Dawson
Attorney, Agent, or Firm—Birgit E. Morris; Donald S. Cohen; James M. Trygg

[57] ABSTRACT

A chuck is shown for holding a stylus during manufacturing of the stylus. The invention includes a method of aligning the chuck and apparatus therefor. The chuck comprises a body and a stylus holder both of which are held separately in mutual alignment in the alignment apparatus. Epoxy is injected into a cavity of the body and the stylus holder inserted into the cavity while maintaining this mutual alignment. The epoxy, being somewhat displaced by the stylus holder, flows about the outer surface of the stylus holder completely filling the space between the two parts. When the epoxy cures, the finished chuck is removed from the alignment apparatus.

9 Claims, 8 Drawing Figures 4,536,238

METHOD AND APPARATUS FOR ALIGNING A CHUCK FOR HOLDING AN INFORMATION CONTAINING DISC STYLUS

This invention relates to work holding chucks and methods and apparatus for use therewith. More particularly this invention relates to a chuck for holding a stylus during manufacturing thereof.

BACKGROUND OF THE INVENTION

Audio and video playback systems of the type using an information-containing-disc having recorded information signals encoded into a fine spiral groove typically utilize a stylus to read the encoded information signals. Included in such systems are the capacitive playback systems, wherein the stylus dielectric material is coated on at least one surface with a conductive metal layer which interacts with the conductive disc to read the information encoded thereon. An example of such a system is disclosed in U.S. Pat. No. 3,842,194 issued Oct. 15, 1974 to Clemens. Clemens discloses a video disc having a playback system utilizing variable capacitance. In one configuration of the Clemens system, information representative of recorded picture and sound is encoded in the form of a relief pattern in a relatively fine spiral groove on the surface of the disc. For example, groove widths of about 2.5 micrometers and groove depths of about 1.0 micrometers may be used. During playback a pickup stylus having a shoe width of 2.0 micrometers and a thin conductive electrode formed thereon, for example about 0.2 micrometer thick, engages the groove as the record is rotated by a supportive turntable. Capacitive variations between the stylus electrode and the disc surface are sensed to recover the pre-recorded information. In systems of the above type, the use of a relatively fine record groove and the requirements for a groove engaging pickup stylus result in a stylus tip which is extremely small. Further, the length of the stylus shoe is critical because if it is too short the stylus may damage the disc due to excessive pressure. If the stylus shoe is too long, on the other hand, stylus life is reduced and electrical performance is degraded.

During the manufacturing of such styli it is often necessary to perform an operation, say a coning operation, on a stylus in one machine and then move the stylus to a different machine for performing another operation, say a faceting operation. Because of the extremely small dimensions involved, the stylus must be very accurately aligned when it is moved to the second machine. Heretofore, chucks having various structures have been utilized to hold these styli. The chucks are easily transfered from machine to machine and maintain accurate alignment when doing so, but only with respect to the first machining operation. Any machining operations performed on the stylus are necessarily only as accurate as the chuck. Therefore, any misalignment of the stylus holding jaws with respect to the shank of the chuck will be reflected in a similar misalignment of the machined surfaces of the stylus with respect to the axis of the stylus. What is needed is a stylus holding chuck having little or no misalignment of the stylus holding jaws with respect to the spindle of the machine which rotates the chuck.

SUMMARY OF THE INVENTION

According to the present invention there is shown a stylus holding chuck and an alignment fixture therefor. The chuck comprises a body having a shank adaptable to a machine tool for effecting movement of the body with respect to a datum. A stylus holding means is included for holding the stylus in alignment with the datum. The stylus holding means has a gripping end for gripping and holding the stylus and a base end for attaching to the body at an end opposite the shank. A filler means rigidly attaches the base end of the stylus holding means to the end of the body opposite the shank.

DESCRIPTION OF THE PREFERRED EMBODIMENT

Figure 2:
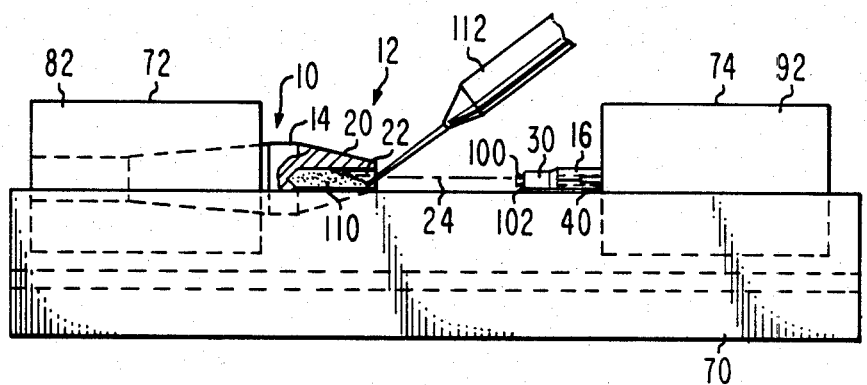
Figure 3:
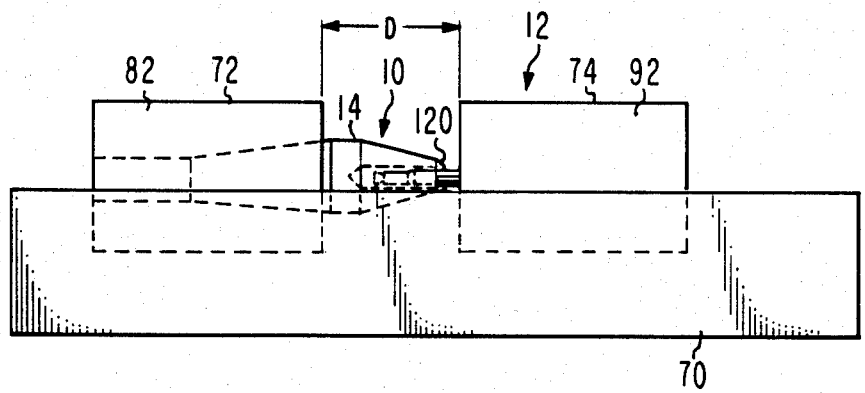
Figure 4:
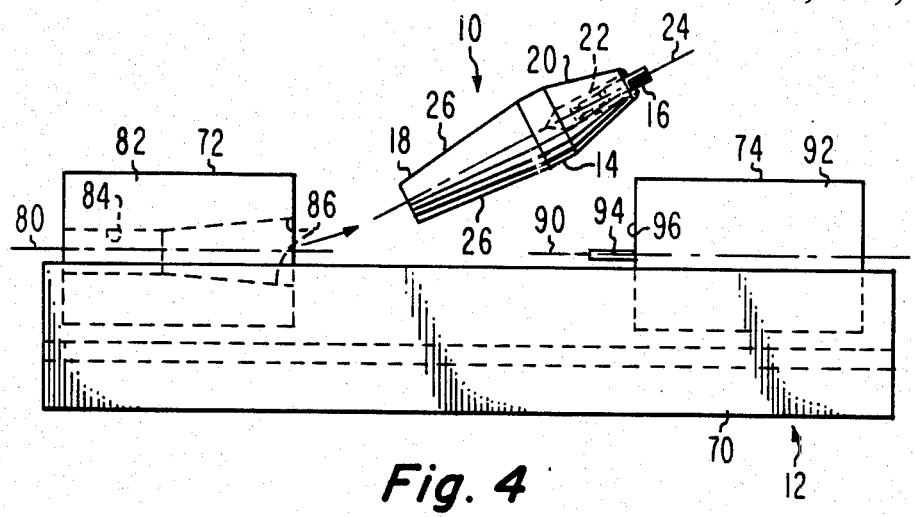

With reference to FIGS. 1 through 4 there is shown a chuck 10 for holding an information-containing-disc stylus and an alignment fixture 12 for aligning and assembling the chuck 10 with respect to a datum. The datam may be any convenient reference line or plane with respect to which the chuck is to be aligned when in operation. The chuck 10, as best seen in FIG. 4, comprises a body 14 and a stylus holder 16. The body 14 includes a shank 18 and a beveled end 20 opposite the shank having a cavity 22 or hole formed in the end thereof. The cavity 22, in the present case, is simply a blind hole drilled into the end 20 along the longitudinal axis 24 of the body 14. The shank 18 includes an outer surface 26 having a three degree locking taper for mating with the spindle of a machine tool such as a coning machine or with the work holder of a faceting machine. In this case the datum is the center of rotation of the spindle or work holder.

Figure 6:
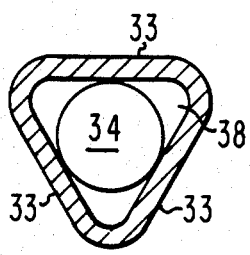
FIG. 6 is a longitudinal cross section of the stylus holding tube shown in FIG. 1.
Figure 5:
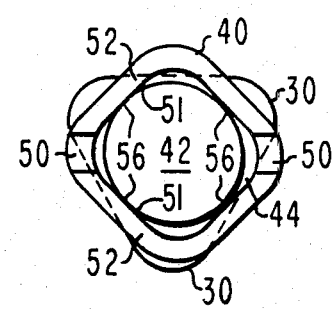
FIG. 5 is a right end view of the fixture shown in FIG. 1.
Figure 8:
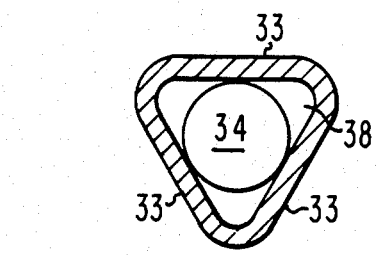
FIG. 8 is a view taken along the lines 8—8 in FIG. 6.
Figure 7:
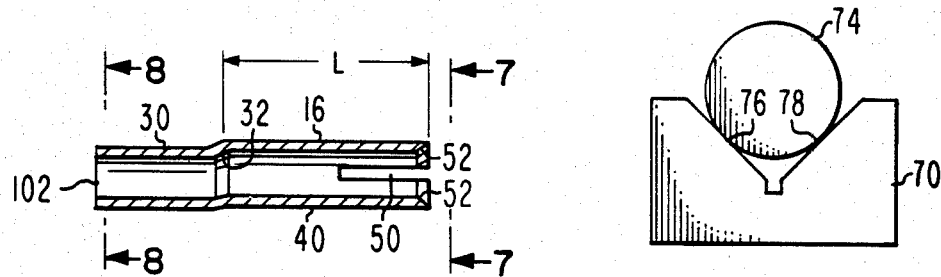
FIG. 7 is a view taken along the lines 7—7 in FIG. 6.

The stylus holder 16 comprises an elongated tube which may be constructed of hypodermic or similar tubing that is commercially available. The elongated tube 16, as best seen in FIGS. 6, 7 and 8, includes a base end 30 having a triangular cross secton which forms an internal shoulder 32. The shoulder 32 forms an angle of about 45 degrees with respect to the longitudinal axis of the tube 16. Note that the shoulder 32 will appear in three places, about 120 degrees apart, corresponding to the three sides 33 of the triangular shaped base end 30. The triangular shape is arranged to that a 15 mil diameter pin 34 will slide into the interior 38 but a 16 mil diameter pin will not. The purpose of the three shoulders 32 will be discussed later. The elongated tube 16 also includes a gripping end 40 opposite the base end 30 having a somewhat square cross sectional shape with rounded corners, as seen in FIG. 7. The gripping end 40 has a length L, as seen in FIG. 6 of approximately 140 mils. The square shape is obtained in a sizing operation that is arranged so that a 20 mil diameter guage pin 42 will slide into the interior 44 as shown in FIG. 7, with little or no play in transverse directions. A slot 50 is formed in the gripping end 40 and arranged diagonally with respect to two opposing corners, as shown in FIG. 7. The slot 50 extends in a direction parallel to the longitudinal axis of the tube 16 for a distance of about 60 mils thereby forming a pair of V-shaped gripping jaws 51. Inwardly directed chamfers 52 are formed at the very end of the gripping jaws 51.

In another sizing operation the gripping jaws 51 are set inwardly a slight amount so that when a stylus, having a diameter of 19 mils, is inserted into the interior 44 of the tube 16, the gripping jaws 51 will be forced apart by the stylus thereby firmly holding the stylus at the four gripping points 56. The stylus is inserted into the interior 44 until it engages the three shoulders 32, thereby centering the engaging end of the stylus with the longitudinal axis of the tube 16. The chamfers 52 provide a guide for aiding the operator while inserting the stylus.

The alignment fixture 12 comprises three basic parts: a V-block 70; a chuck holder 72; and a tube holder 74. The chuck holder 72 is of cylindrical shape having an axis 80 and an outer surface 82 that is smooth and concentric to the axis. The axis 80 represents the datum with respect to which the chuck holder 72 and the tube holder 74 are to be aligned. A knockout hole 84 is drilled through the chuck holder 72 along its axis 80 for a purpose that will be described later. A three degree tapered hole 86 is formed in one end of the chuck holder 72 for mating with the taper 26 of the chuck body 14. The tapered hole 86 is formed exactly concentric to the outer diameter surface 82. The tube holder 74 is of cylindrical shape, having an axis 90 and an outer surface 92 that is smooth and concentric to the axis 90. A cylindrical shaped projection 94 is formed on one end 96 of the tube holder 74 exactly concentric with the outer surface 92. The projection 94 has a nominal diameter of 19 mils which is identical to the diameter of the stylus which is to be held by the finished chuck 10. The length of the projection 94 is slightly greater than the length L of the gripping end 40.

The diameters of the two outer surfaces 82 and 92 must be identical. This requirement and the requirements that the tapered hole 36 be exactly concentric to the surface 82 and the projection 94 be exactly concentric to the surface 92 are accomplished as follows. Assuming that the two parts, the chuck holder 72 and the tube holder 74 are formed in a lathe, a length of bar stock will be secured in the normal manner in the lathe's chuck. A portion of the bar will project forward of the chuck by a distance greater than the combined lengths of the two parts to be made. The outer surface of the exposed bar is turned down to a predetermined diameter, in the present case about one half inch. The size of the diameter is not critical, however, the size must be constant for the entire length of the turned portion and the turned surface should be very smooth.

The projection 94 is then formed on the end of the bar projecting from the lathe chuck. A cut-off tool is then positioned adjacent the turned surface a distance away from the end of the projection 94 equal to the desired length of the tube holder 74. The cut-off tool is then plunged inwardly thereby severing the finished tube holder 74 from the turned bar stock. Since all machining operations were completed without moving or repositioning the bar stock within the lathe chuck, the diameter of the projection will be exactly concentric with the outer diameter of the surface 92.

The end of the bar stock remaining in the lathe chuck is faced off and the knockout hole 84 drilled into the bar stock a distance greater than the desired length of the chuck holder 72. The tapered hole 86 is then bored into the bar to the proper depth. The hole 84 is simply a clearance hole and, therefore, need not be exactly concentric with the turned diameter. The tapered hole 86, on the other hand, must be exactly concentric with the turned diameter and therefore must be bored. As with the tube holder 74, a cut-off tool is positioned adjacent the turned surface a distance away from the faced end of the bar stock equal to the desired length of the chuck holder 72. The cut-off tool is then plunged inwardly thereby severing the finished chuck holder 72 from the remaining turned bar stock.

The individual machining operations described above are well known in the art and, therefore, will not be further described here. It will be understood, however, that this invention teaches a unique and useful combination of such machining operations in the fabrication of the chuck holder 72 and the tube holder 74 although the order of these machining operations is not critical.

The V-block 70 is similar to V-blocks that are commonly used by machinists and tool makers for holding parts while machining and inspecting. Such V-blocks are commercially available and widly used. The only requirement of the V-block 70 is that the surfaces 76 and 78 be flat and have smooth finishes so that when the chuck holder 72 and the tube holder 74 are placed on these surfaces within the V, they may be made to slide longitudinally along the V easily and smoothly. If the two holders 72 and 74 are made using the technique described above, when placed within the V of the V-block, they will have the following relationship. A longitudinal axis or datam will be defined to which both the tapered hole 86 and the projection 94 are exactly concentric independent of the longitudinal spacing between the chuck holder 72 and the tube holder 74. This relationship is maintained as the chuck holder 72 and the tube holder 74 are made to slide back and forth within the V in accordance with the operation of the alignment fixture 12 as described below.

Figure 1:
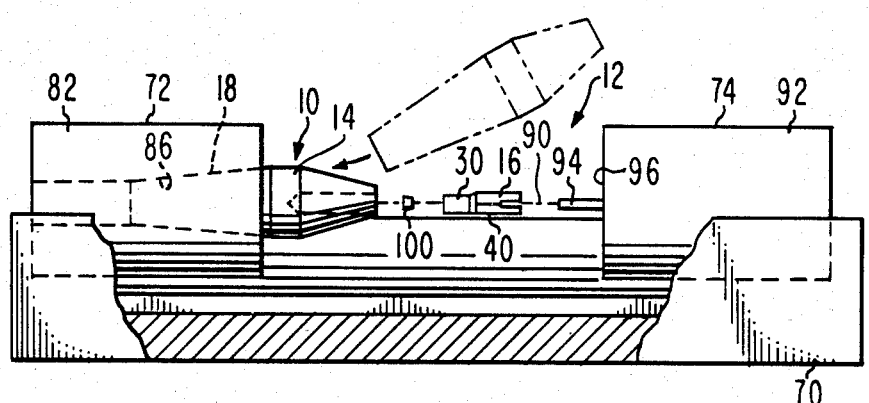
FIGS. 1 through 4 are front elevation views of the alignment fixture showing the stylus holding chuck in various degrees of completion.

In operation the tapered shank 18 of the chuck body 14 is inserted into the tapered hole 86 of the chuck holder 72 in locking engagement therewith, as shown in FIG. 1. The two holders 72 and 74 are placed within the V of the V-block sufficiently spaced apart to accomplish this. The stylus holder 16 is positioned as shown in FIG. 1 and the projection 94 of the tube holder 74 is inserted into the gripping end 40 of the stylus holder 16, as shown in FIG. 2. The projection 94 is inserted until it engages the shoulders 32 of the stylus holder 16 which centers and aligns the stylus holder 16 with the axis 90 of the tube holder 74. As shown in FIG. 2, a plug 100 is inserted into the triangular opening of the end 102 of the stylus holder 16 to seal the interior 38 with respect to that end for a purpose that will become apparent. The plug 100 may be made of any suitable material such as wood, plastic, rubber, or the like.

A measured quantity of epoxy 110 or other matrix material or the like is injected into the cavity 22 using an appropriate syringe 112, as shown in FIG. 2. The two holders 72 and 74 are then urged toward each other while maintaining their respective outer surfaces 82 and 92 in sliding contact with the surfaces 76 and 78 of the V-block 70. As the two holders 72 and 74 are brought closer together, the base end 30 of the tube 16 penetrates the cavity 22 displacing the epoxy 110 and causing it to flow between the walls of cavity 22 and the outer surfaces of the tube 16. The presence of the plug 100 prevents the flow of epoxy into the interior 38 of the base end 30. The two holders 72 and 74 are brought to within a predetermined distance D of each other, as shown in FIG. 3, and held in this position. Standard V-block clamps, not shown, may be used to hold the two holders in place or the holders may simply remain there without clamps. It will be noted that the predetermined quantity of epoxy 110 that is injected into the cavity 22, as shown in FIG. 2, is just sufficient to cause the epoxy to form a small bead 120 adjacent the end of the body 14. Additionally, the epoxy 110 may be of the electrically conducting type where the application requires electrical continuity between the shank 18 of the body and the stylus that is to be held by the gripping end 40 of the tube 16.

When the epoxy has cured sufficiently, the two holders 72 and 74 are carefully separated while keeping their respective outer surfaces 82 and 92 in sliding contact with the surfaces 76 and 78 of the V-block 70. This causes the projection 94 to slide out of the stylus holder 16. The finished chuck 10 is then removed from the chuck holder 72 by use of a drift punch in the normal manner which is well known in the art, see FIG. 4. In operation, a stylus is inserted into the gripping end 40 of the chuck 10 sufficiently far so that the end of the stylus engages the three shoulder 32, as did the projection 94 as described above. The axis of the stylus will now be substantially coaxial to the taper 26 so that when the shank 18 is inserted into the locking taper of a rotatable spindle, and the spindle is rotated, the stylus will rotate perfectly true.

I claim:

1. A chuck for holding a stylus comprising:
    (a) a body having a shank associated therewith, said shank being adaptable to a machine tool for effecting movement of said body with respect to a datum;
    (b) stylus holding means for holding said stylus in alignment with said datum, said stylus holding means having a gripping end for gripping and holding said stylus and a base end for attaching to said body at an end opposite said shank;
    (c) filler means rigidly attaching said base end of said stylus holding means to said end of said body opposite said shank.

2. The apparatus set forth in claim 1 wherein said movement of said body is rotational movement of said body and said datam is an axis of said rotational movement.

3. The apparatus set forth in claim 2 further comprising a cavity formmed in said end opposite said shank wherein said base end of said stylus holding means is disposed within said cavity.

4. The apparatus set forth in claim 3 wherein a portion of said filler means is disposed within said cavity adjacent said base end of said stylus holding means.

5. The apparatus set forth in claim 4 wherein said cavity is a hole drilled in said body substantially coaxial to said axis of rotation and said stylus holding means comprises an elongated tube.

6. The apparatus set forth in claim 5 wherein said gripping end comprises an end of said elongated tube having a slot formed therein and said base end comprises the opposite end of said elongated tube having an inside shoulder formed therein, said inside shoulder including a bevel arranged to engage an end of said stylus and thereby hold said stylus in said alignment with said axis.

7. A method of assembling a stylus holding tube to a chuck body wherein said stylus holding tube includes an elongated tube having a first end for gripping a stylus and a second end opposite thereto and wherein said chuck body includes a shank formed with respect to an axis of rotation and a hole formed in said chuck body opposite said shank, comprising the steps of:
    (a) aligning said stylus holding tube with respect to said axis of rotation of said chuck body;
    (b) inserting said second end of said elongated tube into said hole of said chuck body while maintaining said alignment;
    (c) inserting a matrix material into said hole of said chuck body; and
    (d) causing said matrix material to flow around and to contact a portion of both of said chuck body and said second end of said stylus holding tube.

8. The method set forth in claim 7 wherein said aligning includes:
    (a) placing said shank of said body into a shank receiving end of a first tool; and
    (b) placing said first end of said stylus holding tube onto a projection of a second tool.

9. The method set forth in claim 8 wherein said inserting said second end into said hole includes moving one of said first and second tools with respect to the other.

* * * * *